United States Patent [19]

Braithwaite et al.

[11] 4,448,600
[45] May 15, 1984

[54] MOULD OPENING AND CLOSING MECHANISM

[75] Inventors: David Braithwaite, Doncaster; Stanley P. Jones, Tickhill, both of England

[73] Assignee: Emhart Industries, Inc., Farmington, Conn.

[21] Appl. No.: 433,140

[22] PCT Filed: Feb. 22, 1982

[86] PCT No.: PCT/GB82/00049
§ 371 Date: Sep. 30, 1982
§ 102(e) Date: Sep. 30, 1982

[87] PCT Pub. No.: WO82/02877
PCT Pub. Date: Sep. 2, 1982

[30] Foreign Application Priority Data

Feb. 27, 1981 [GB] United Kingdom .......... 8106259

[51] Int. Cl.³ .......................................... C03B 11/06
[52] U.S. Cl. .......................... 65/360; 65/227; 65/261; 65/359
[58] Field of Search .............. 65/227, 261, 264, 265, 65/359, 360

[56] References Cited

U.S. PATENT DOCUMENTS

| | | | |
|---|---|---|---|
| 3,472,639 | 10/1969 | Mumford | 65/359 X |
| 3,607,207 | 9/1971 | Dahms et al. | 65/359 X |
| 3,617,233 | 11/1971 | Mumford | 65/359 X |
| 3,721,545 | 3/1973 | Irwin | 65/261 |
| 3,967,946 | 7/1976 | Campbell | 65/359 X |
| 4,009,016 | 2/1977 | Foster | 65/16 |
| 4,137,061 | 1/1979 | Mallory | 65/232 |
| 4,261,724 | 4/1981 | Sarkozy | 65/261 X |

FOREIGN PATENT DOCUMENTS

| | | | |
|---|---|---|---|
| 813789 | 3/1937 | France. | |
| 2383136 | 3/1978 | France. | |
| 466117 | 5/1937 | United Kingdom | 65/359 |

Primary Examiner—Arthur D. Kellogg
Attorney, Agent, or Firm—Gene Warzecha

[57] ABSTRACT

A mould opening and closing mechanism for opening and closing three moulds simultaneously. Moving means (18, 20) operable to move mould portions (12) is connected to the mould portions (12) via a system of links which serves to equalize the mould closing pressures of the three moulds. The system of links comprises a link (34) centrally connected to the moving means (18, 20) which equalizes the pressure between one mould and a further link (46) and the further link (46) equalizes the pressure between the other two moulds.

4 Claims, 4 Drawing Figures

Fig_1

MOULD OPENING AND CLOSING MECHANISM

TECHNICAL FIELD

This invention is concerned with a mould opening and closing mechanism for use in opening and closing three moulds simultaneously.

In various industries, it is necessary to open and close three moulds simultaneously. For example, when glassware containers are manufactured by an individual section machine with three containers being manufactured simultaneously, gobs of glass are supplied to three parison-forming moulds at a molding station of the machine and the completed parisons are transferred to three further moulds at a blowing station of the machine to be blown into the finished containers. At both stations of such a machine, it is necessary to provide a mould opening and closing mechanism for use in opening and closing three moulds simultaneously at appropriate times in the cycle of operation of the machine.

BACKGROUND ART

Existing mould opening and closing mechanisms for use in opening and closing three moulds simultaneously by moving a portion of each mould relative to further portions of that mould comprise three mould portion supports each arranged to support a portion of a mould, three levers each of which is pivotal on a fixed pivot and each of which is pivotally connected to one of the mould portion supports, and moving means connected to the levers and operable to cause the levers to pivot about the fixed pivots so that the mould portion supports are moved and the mould portions are moved away from or towards further mould portions thereby opening or closing the moulds. It is desirable that such a mechanism should operate rapidly and accurately and should close the three moulds with substantially equal pressures. However, the problem of providing substantially equal closing pressures to three moulds with rapidly and accurately operating mechanism as hitherto only been solved partially.

DISCLOSURE OF INVENTION

According to the invention the moving means of the mould opening and closing mechanism is connected to the three levers by a system of links comprising a link pivotally connected at a central region thereof to the moving means, the link being pivotally connected on one side of the central region thereof to a first of the levers and also being pivotally connected on the other side of the central region thereof and half the effective distance therefrom to a further link of the system, the further link being pivotally connected to a second and a third of the levers on opposite sides of and at equal effective distances from its pivotal connection to the link.

In a preferred mould opening and closing mechanism, in order to improve the accuracy of the mould closing, the three mould portion supports are mounted on linear slideways extending towards and away from the further mould portions. For ease of construction, a central one of the three mould portion supports is mounted on a slideway and the slideways of the other two supports are formed on the central support.

In order to enable the mould opening and closing mechanism to move further portions of the moulds, in the preferred mould opening and closing mechanism, the moving means is also connected to three further levers each of which is pivotal on a fixed pivot and each of which is pivotally connected to a further mould portion support arranged to support one of the aforementioned further mould portions so that operation of the moving means is effective to move the mould portions and the further mould portions towards or away from each other.

BRIEF DESCRIPTION OF DRAWINGS

In the accompanying drawings:

FIG. 1 is a cross-sectional view of a moulding station which incorporates a mould opening and closing mechanism according to the invention, the line I—I in FIG. 2 indicating the section on which FIG. 1 is taken, the station being shown in a mould open condition;

BEST MODE OF CARRYING OUT THE INVENTION

Figure 1:
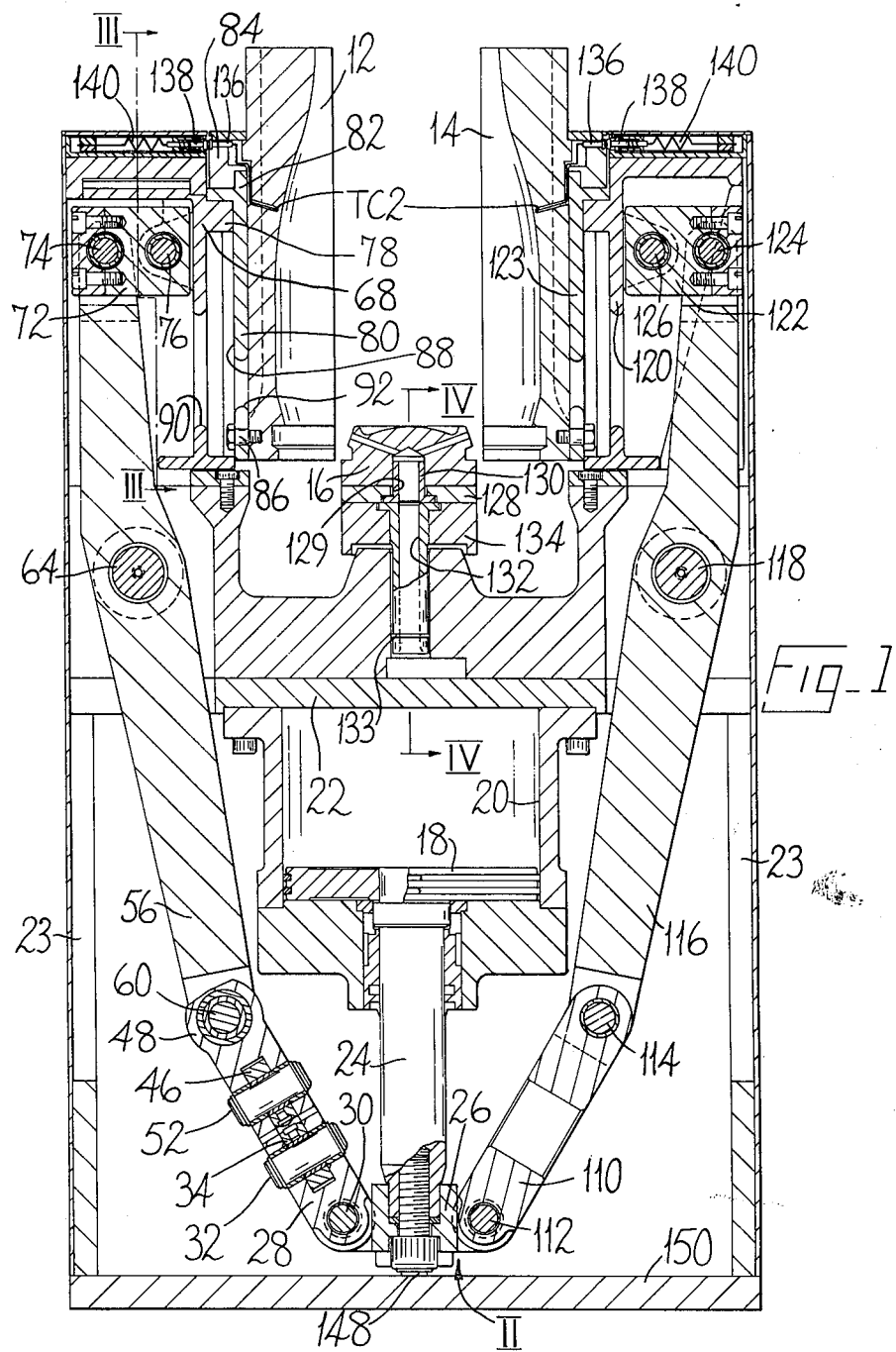

The moulding station shown in the drawings comprises a mould opening and closing mechanism for use in opening and closing three moulds simultaneously by moving a first portion 12 and a second portion 14 of each mould into engagement with each other and with a bottom mould portion 16 of that mould to form a completed mould. The mould portions 12, 14 and 16 close around a parison of glass which is then blown to the shape of a cavity defined by the mould portions 12, 14 and 16. The moulding station is, thus, intended to form part of an individual section glassware container forming machine but it is to be understood that the invention could equally be applied to the parison moulding station of such a machine or to another suitable machine. The three mould portions 12 are arranged in a straight line as are the mould portions 14 and the bottom mould portions 16.

The mould opening and closing mechanism comprises a piston 18 and cylinder 20 assembly; the cyclinder 20 of which is mounted on the underside of and depends from a support plate 22 which is supported by a framework 23 of the mould station. The piston and cylinder assembly 18, 20 is operable to move a piston rod 24 thereof which depends from the piston 18. A crosshead 26 is fixedly mounted on the piston rod 24 to be moved therewith. The crosshead 26 is pivotally connected on one side thereof (the left viewing FIGS. 1 and 2) to a system of links.

The system of links comprises a first link 28 which is pivotally mounted on a horizontal pivot pin 30 mounted on the crosshead 26. The first link 28 carries a pivot pin 32 on which a second link 34 of the system of links is pivotally mounted. The second link 34 (see FIG. 2) is pivoted about a central region thereof on the pin 32 and is also pivoted on two further pivot pins 36 and 38. The link 34 is therefore pivotally connected at a central region thereof to the piston and cylinder assembly 18, 20. The pivot pin 36 forms a pivotal connection between the link 34 and a third link 40 of the system of links at an end portion of the link 34. The link 40 is also pivotally connected to a first lever 42 of the mechanism by means of a pivot pin 44. The pivot pin 38 is on the opposite side of the pivot pin 32 to the pivot pin 36 and forms a pivotal connection between the second link 34 and a fourth link 46 of the system. The affective distance between the pivot pins 32 and 38 is half that between the pivot pins 32 and 36 (see FIG. 2). Thus, the link 34 is pivotally connected on one side of the central region thereof to the lever 42 and on the other side of the central region thereof and half the effective distance therefrom to the link 46. The fourth link 46 is pivotally connected at a central region thereof to the second link 34 by the pivot pin 38 and also has pivotal connections, on opposite sides of the central region thereof and equidistant therefrom, to a fifth 48 and a sixth 50 link of the system. The pivotal connection between the fourth 46 and the fifth 48 links is by means of a pivot pin 52 and the pivotal connection between the fourth 46, and the sixth 50 links is by means of a pivot pin 54. The fifth link 48 and the sixth link 50 are respectively pivotally connected to a second lever 56 and a third lever 58 of the mechanism by means of pivot pins 60 and 62.

The three levers 42, 56 and 58 are each connected at a lower end portion thereof to the system of links, as described above, and are mounted for pivotal movement about a central region thereof on horizontal pivots provided by pins 64 (FIG. 1) which are supported by the framework 23, each lever 42, 56 and 58 being pivotal on a separate pin 64. At an upper end portion thereof, each of the levers 42, 56 and 58 is pivotally connected to one of three mould portion supports 66, 68 and 70 which each support one of the mould portions 12 (see also FIG. 3). The connections between the levers 42, 56 and 58 and the supports 66, 68 and 70 are identical, each lever being pivotally connected to a block 72 by means of a pin 74 and the block 72 being pivotally connected to the support 66, 68 or 70 by means of a pin 76.

The piston and cylinder assembly 18, 20 provides moving means of the mechanism connected to the levers 42, 56 and 58 and operable to cause the levers to pivot about the pivot pins 64 so that the mould portion supports 66, 68 and 70 are moved and the mould portions 12 are moved away from or towards the further mould portions 14, thereby opening or closing the moulds. The purpose of the system of links 28, 34, 40, 46, 48 and 50 is to cause the moving means to apply substantially equal pressure to the three levers 42, 56 and 58 so that substantially equal mould closing pressures will be achieved. Downwards movement of the crosshead 26 (it is shown in its lowermost position in the drawings) by the action of the piston and cylinder assembly 18, 20 causes the levers 42, 56 and 58 to pivot about the pins 64 (anti-clockwise viewing FIG. 1) thereby moving the blocks 72 and the supports 66, 68 and 70 to the left. Since the supports 66, 68 and 70 carry the mould portions 12, the mould portions 12 also move to the left away from the mould portions 14 so that the moulds are opened. On the other hand, upwards movement of the crosshead 26 by the action of the piston and cylinder assembly 18, 20 causes the levers 42, 56 and 58 to pivot about the pins 64 (clockwise) thereby moving the mould portions 12 towards the mould portions 14 and closing the mould. The system of links 28, 34, 40, 46, 48 and 50 acts to equalise the pressure between the three sets of mould portions 12 and 14 since the second link 34 equalises the pressure between the pivot pins 36 and 38 because of the two-to-one ratio of the distances between the pins 36 and 32 and the pins 38 and 32, and the fourth link 46 equalises the pressure between the pivot pins 52 and 54.

The three mould supports 66, 68 and 70 are each arranged to support one of the mould portions 12. Each support 66, 68 and 70 has a projection 78 (FIG. 1) which is T-shaped in plan view (not shown) and on to which an intermediate support 80 is removably mounted with the projection 78 received in a T-shaped slot (not shown) in the support 80. The projection 78 is a loose fit in the T-shaped slot to allow the support 80 to move slightly sideways relative to the support 66, 68 or 70. A portion of the support 80 projects above the projection 78 to support the support 80 on the support 66, 68 or 70. The intermediate support 80 has an upstanding lip portion 82 over which a hook portion 84 of the mould portion 12 fits to mount the mould portion 12 on the support 80 and hence on the support 66, 68 or 70. A bolt 86 also interconnects the intermediate support 80 and the mould portion 12. The support 66, 68 or 70 and the intermediate support 80 define a space 88, beneath the projection 78, which serves to insulate the mould portion 12 from the support 66, 68 or 70. In the operation of the machine, cooling air is blown between the levers 42, 56 and 58 into the space 88 through an aperture 90 in the support 66, 68 or 70 and on to the mould portion through an aperture 92 in the intermediate support 80. The air passing through the aperture 92 finally passes between cooling fins 94 (FIG. 3) of the mould portion 12.

Figure 3:
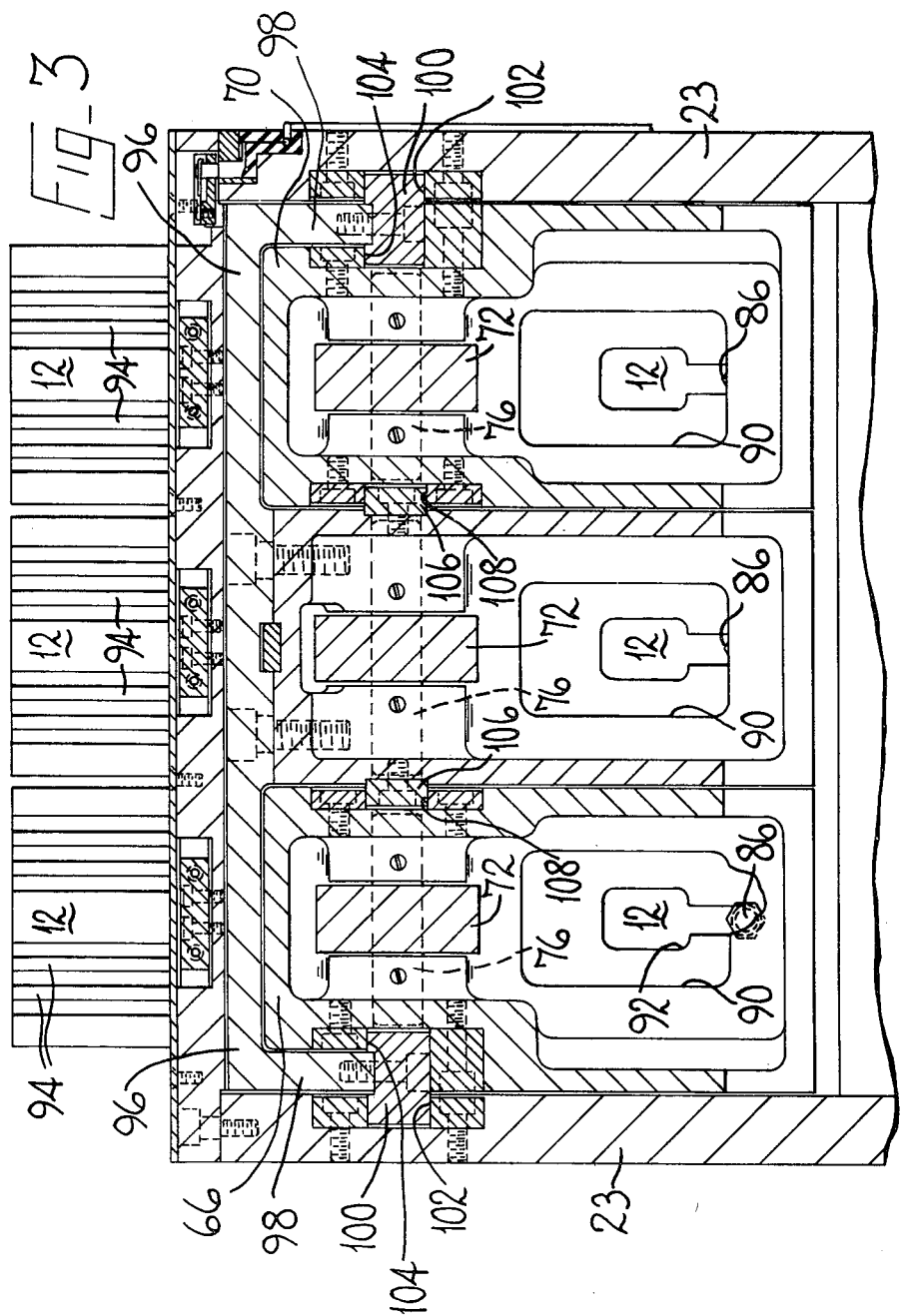
FIG. 3 is a sectional view taken on the line III—III in FIG. 1.

The three mould portion supports 66, 68 and 70 are each mounted on a linear slideway so that operation of the piston and cylinder assembly 18, 20 is arranged to pivot the levers 42, 56 and 58 about their pivots 64 to cause the mould portion supports 66, 68 and 70 to move along the slideways to bring the mould portions 12 supported thereby into engagement with the mould portions 14. The central one 68 of the supports 66, 68 and 70 comprises a plate 96 (FIG. 3). The plate 96 extends above the other two supports 66 and 70 and has two depending portions 98 at end portions thereof which are each secured to a slide rail 100 which is slideable in a groove 102 in the framework 23. The rails 100 and the grooves 102 provide the slideway of the central support 68. The slideway of the support 66 is provided by one of the slide rails 100 which enters a groove 104 in the support 66 and by a slide rail 106 mounted on the central support 68 which enters a groove 108 in the support 66. The slideway of the support 70 is provided in identical manner to that of the support 66. Thus, the central support 68 is mounted on a slideway, formed by the rails 100 and the groove 102 and the slideways of the other two supports 66 and 70 are formed on the central support 68. This arrangement allows the supports 66, 68 and 70 to move relative to one another to equalise the mould closing forces.

Figure 2:
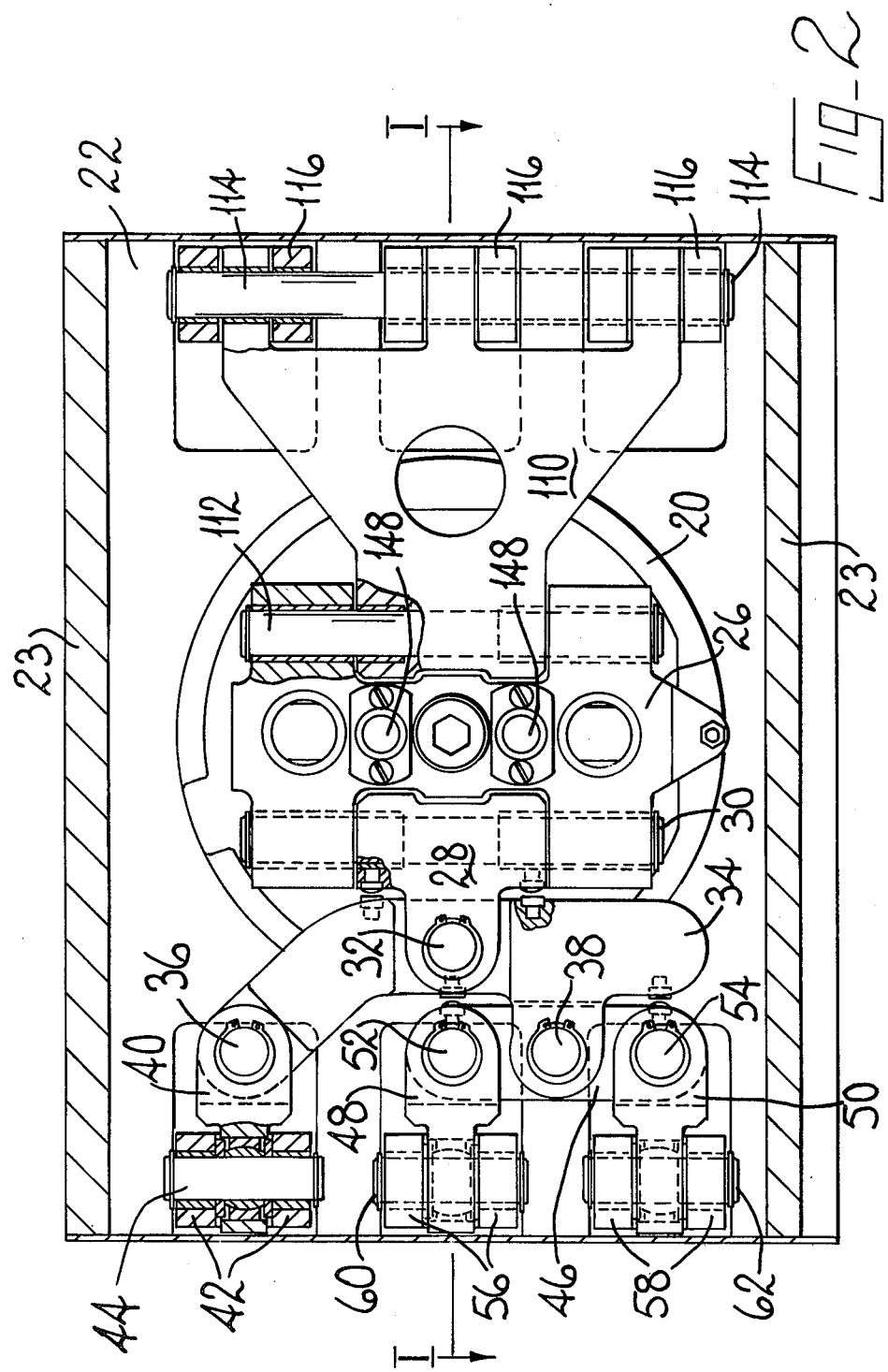
FIG. 2 is an underneath view of the moulding station taken in the direction of the arrow 2 in FIG. 1 and showing the station in a mould closed condition.

In addition to its connection to the system of links 28, 34, 40, 46, 48 and 50, the crosshead 26 is pivotally connected to a further link 110 on the right hand side thereof (viewing FIGS. 1 and 2). The crosshead 26 has a pivot pin 112 mounted thereon on which the link 110 is pivoted. The link 110 is also pivotally connected, by means of a pivot pin 114 to three further levers 116. The three further levers 116 are each connected at a lower end portion thereof to the link 110 and are mounted for pivotal movement about a central portion thereof on a horizontal fixed pivot pin 118, all three levers 116 being pivoted on the same pin 118, the pin 118 is supported by the framework 23. At upper end portions thereof, the three levers 116 are pivotally connected to a further mould portion support 120 which is arranged to support the three mould portions 14. The connection between each lever 116 and the support 120 is identical and identical to that between the levers 42, 56 and 58 and the supports 66, 68 and 70, each lever 116 being pivotally connected to a block 122 by means of a pin 124 and the block 122 being pivotally connected to the support 120. The support 120 is mounted in a linear slideway (not shown) similar to that of the support 68 for movement towards or away from the support 66, 68 and 70. The support 120 carries three intermediate supports 123 which are identically arranged to the intermediate supports 80 and carry the three mould portions 14. The arrangement is such that operation of the piston and cylinder assembly 18, 20 is effective to cause the three mould portion supports 66, 68 and 70 and the further mould portion support 120 to move simultaneously towards each other so that the mould portions 12 and 14 supported thereby move into engagement to form three moulds. The piston and cylinder assembly 18, 20 thus forms moving means effective to move the mould portions 12 and the mould portions 14 towards or away from each other. The mould opening and closing mechanism is capable of rapid and accurate operation and achieves substantially equal mould closing pressures.

Figure 4:
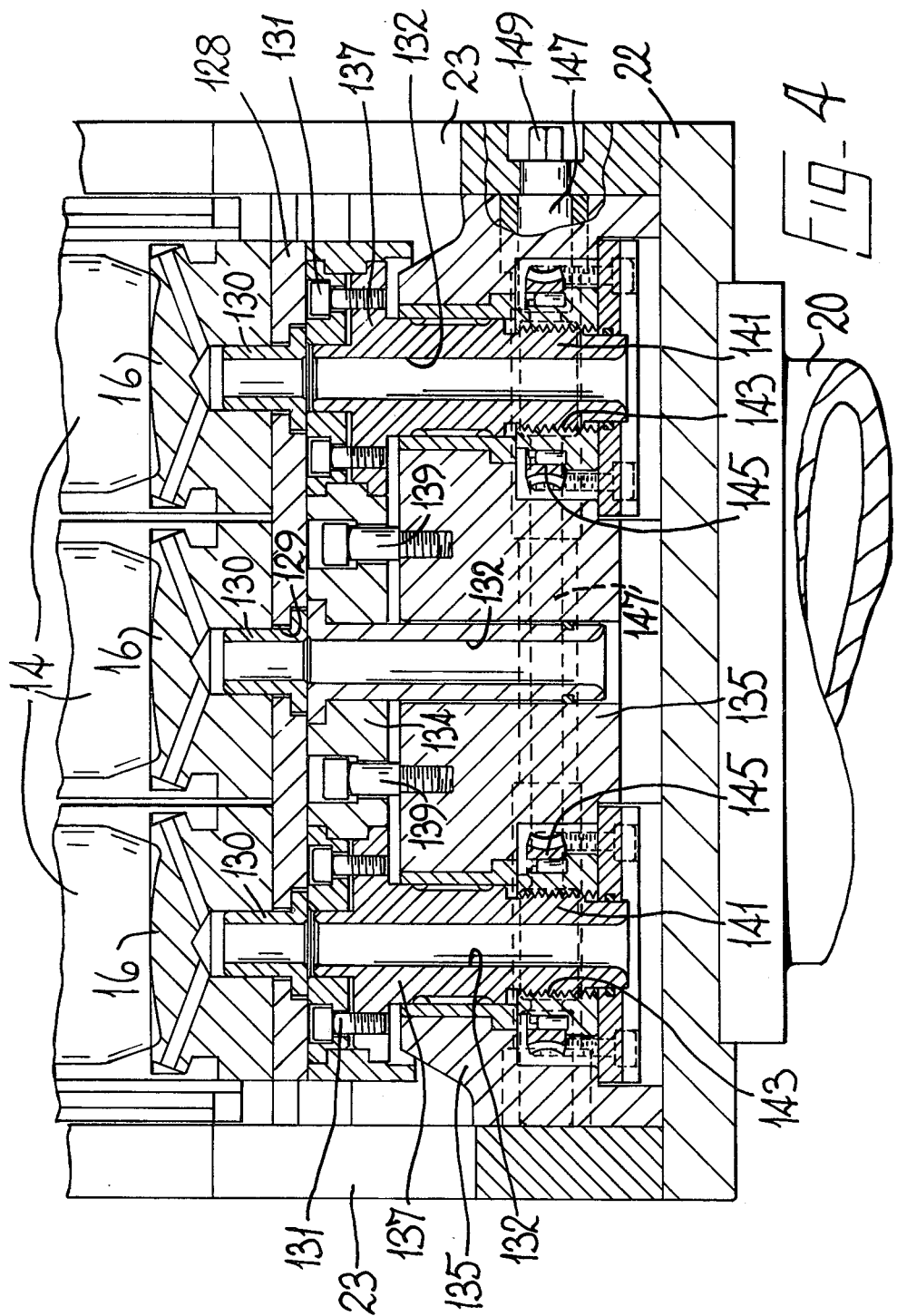
FIG. 4 is a sectional view taken on the line IV—IV in FIG. 1.

When the mould portions 12 and 14 engage one another, they also engage the aforementioned bottom mould portion 16. Each bottom mould portion 16 is supported by a plate 128 which has apertures 129 in which hollow bosses 130 are received. Each hollow boss 130 extends into the mould portion 16 and is a loose fit in the aperture 129 so that the boss 130 and the mould portion 16 can move slightly relative to the plate 128 to accommodate itself better to the mould portions 12 and 14. The interior of the boss 130 communicates with a vacuum pipe 132 so that vacuum can be applied to the mould portion 16 if desired. The central one of the pipes 132 is mounted in a support 134 on which the plate 128 rests and extends into a vertical bore in a portion 135 of the framework 23, with a seal 133 sealing the gap between the pipe 132 and the bore. The two end pipes 132, however, (see FIG. 4) are formed in vertical spindles 137 which are clamped to the support 134 by screws 131 and are slideable vertically in the portion 135. The spindles 137 carry the support 134. The support 134, and hence the mould portion 16, is vertically adjustable by vertical movement of the spindles 137 between limits set by two stop screws 139 which project upwardly from the portion 135. Each of the spindles 137 has screw-threaded lower portion 141 which is threadedly-received in a threaded bore 143 in a gear 145 mounted for rotation in a recess in the support 135 so that, when the gears 145 are rotated, the spindles 141 and hence the mould portions 16 are moved vertically. A worm 147 meshes with both gears 145 so that, when the worm 147 is turned by means of a fitment 149, the gears 145 and hence the spindles 141 are moved together. The support 134 is thus vertically adjustable by adjustment means to alter the height of the plate 128 to suit different sizes of mould.

When the mould portions 12 and 14 are at their furthest distance apart i.e. in a mould open position (as shown in FIG. 1), electrical contact members 136 mounted on the mould portions 12 and 14 make electrical contact with electrical contact members 138 mounted on the framework 23 and urged by springs 140 towards the contact members 136. Thus, when the moulds are fully open, there is electrical contact between the contact members 136 and 138. The contact members 136 are connected to temperature sensing means in the form of a thermocouple embedded in the mould portion 12 or 14 (the thermocouples TC2 of the central mould portions 12 and 14 are shown in FIG. 1). In order to facilitate removal and replacement of the mould portions 12 and 14, a crosshead 26 carries two spring devices 148 (FIGS. 1 and 2). The devices 148 press on a plate 150 of the framework 23 when the mould portions 12 and 14 are in the mould open condition (FIG. 1) so that, when air pressure is removed from the cylinder 20 for mould portion removal, the devices 148 move the crosshead 26 upwards and hence move the mould portions 12 and 14 slightly towards one another breaking the contact between the contact members 136 and 138. The thermocouples TC2 can be used to control the temperature of the moulds formed by the portions 12, 14 and 16 by regulating the supply of cooling air thereto.

We claim:

1. A mould opening and closing mechanism for use in opening and closing three moulds simultaneously by moving a portion of each mould relative to further portions of that mould, the mechanism comprising three mould portion supports (66, 68, 70) each arranged to support a portion of a mould (12), three levers (42, 56, 58) each of which is pivotal on a fixed pivot (64) and each of which is pivotally connected to one of the mould portion supports (66, 68, 70), and moving means (18, 20) connected to the levers (42, 56, 58) and operable to cause the levers (42, 56, 58) to pivot about the fixed pivots (64) so that the mould portion supports (66, 68 70) are moved and the mould portions (12) are moved away from or towards further mould portions (14) thereby opening or closing the moulds, characterised in that the moving means (18, 20) is connected to the three levers (42, 56, 58) by a system of links comprising a link (34) pivotally connected at a central region thereof to the moving means (18, 20), the link (34) being pivotally connected on one side of the central region thereof to a first (42) of the levers and also being pivotally connected on the other side of the central region thereof at half the effective distance therefrom to a further link (46) of the system, the further link (46) being pivotally connected to a second (56) and a third (58) of the levers on opposite sides of and at equal effective distances from its pivotal connection to the link (34).

2. A mould opening and closing mechanism according to claim 1, characterised in that the three mould portion supports (66, 68 70) are mounted on linear slideways (100, 102, 104, 106, 108) extending towards and away from the further mould portions (14).

3. A mould opening and closing mechanism according to claim 2, characterised in that a central one (68) of the three mould portion supports is mounted on a slideway (100, 102) and the slideways (104, 106, 108) of the other two supports (66, 70) are formed on the central support (68).

4. A mould opening and closing mechanism according to any one of claims 1 to 3, characterised in that the moving means (18, 20) is also connected to three further levers (116) each of which is pivotal on a fixed pivot (118) and each of which is pivotally connected to a further mould portion support (120) arranged to support one of said further mould portions (14) so that operation of the moving means (18, 20) is effective to move the mould portions (12) and the further mould portions (14) towards or away from each other.

* * * * *